Feb. 23, 1960 A. R. SANDGREN 2,925,766
LOCKING DEVICES FOR PHOTOGRAPHIC CASSETTES, PARTICULARLY
CASSETTES FOR X-RAY PHOTOGRAPHS
Filed Sept. 6, 1956 2 Sheets-Sheet 1
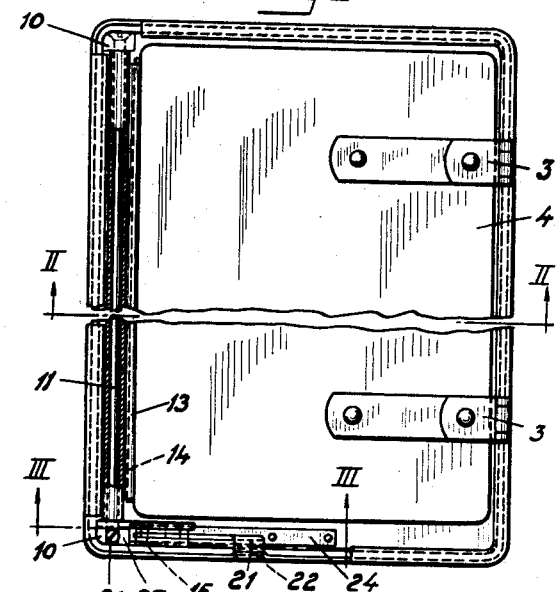
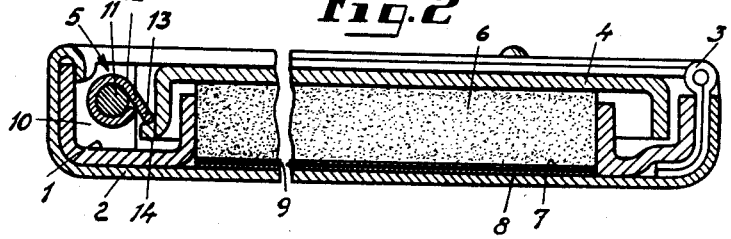
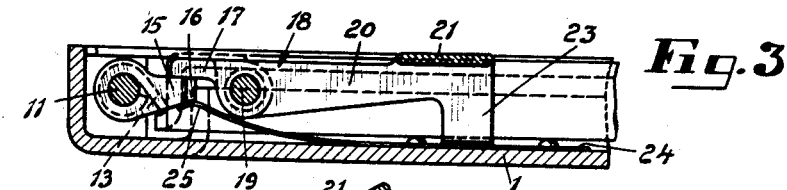
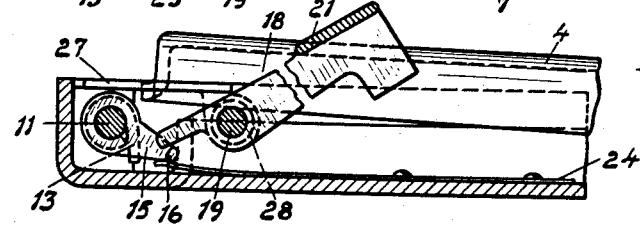
INVENTOR.
Axel Robert Sandgren
BY
Atty Feb. 23, 1960 A. R. SANDGREN 2,925,766
LOCKING DEVICES FOR PHOTOGRAPHIC CASSETTES, PARTICULARLY
CASSETTES FOR X-RAY PHOTOGRAPHS
Filed Sept. 6, 1956 2 Sheets-Sheet 2
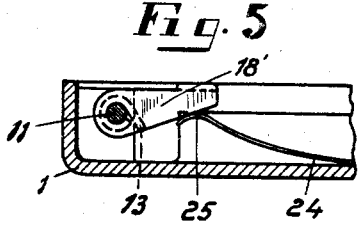
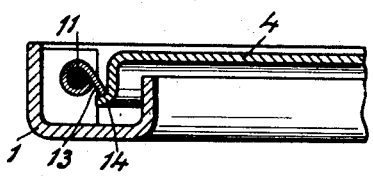
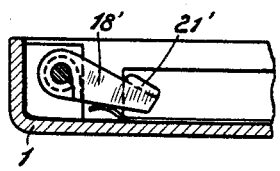
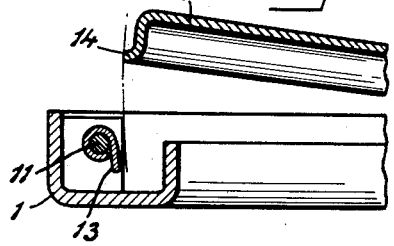
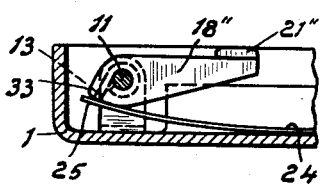
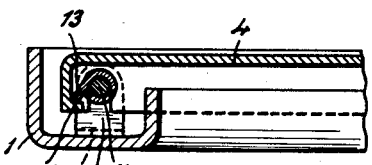
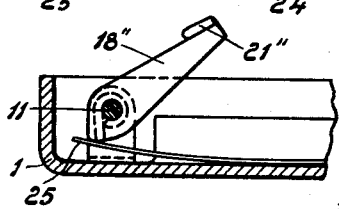
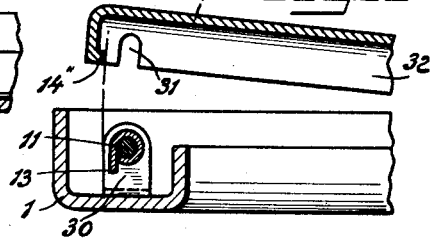
INVENTOR.
Axel Robert Sandgren
BY
Peter G. Boesen
Atty

United States Patent Office 2,925,766
Patented Feb. 23, 1960

2,925,766

LOCKING DEVICES FOR PHOTOGRAPHIC CASSETTES, PARTICULARLY CASSETTES FOR X-RAY PHOTOGRAPHS

Axel Robert Sandgren, Stockholm, Sweden, assignor to AB Ceaverken, Strangnas, Sweden Application September 6, 1956, Serial No. 608,302

Claims priority, application Sweden September 10, 1955

7 Claims. (Cl. 95—71)

The present invention relates to a locking device for photographic cassettes, particularly cassettes for X-ray photographs, the cover of which cassettes is carried by means of hinges at one of its borders and which cassettes have a pin turnably carried on their bottom which pin is provided with an outstanding tongue and can be turned by means of an operating arm, said tongue cooperating with a locking edge on the part of the cassettes cover situated opposite the hinges.

In an earlier known type of cassette of this kind, the pin is provided with one or several longitudinal slots in which the locking edge of the cassettes cover engages when the cover is turned towards the bottom of the cassettes. When the operating arm thereupon is turned towards the cassette bottom, the cover is pressed against this bottom and is kept in locked position by bringing the locking edge to a position between the pin and the bottom by turning the pin through approximately 180°. The operating arm must be turned to a certain position if there should be a possibility at all to close the cassette. If the operating arm unintentionally has been swung upwards, it must first be returned to its completely turned-out, initial position. Both hands of the operating person are occupied, as one hand must be used for the closing movement and the other for the turning of the operating arm. Owing to the fact that the cassette must be handled in complete darkness, the closing of the same causes certain difficulties.

The purpose with the invention is to overcome these difficulties. The main features of the invention are that the locking tongue by means of a spring can be swung with its free end to a position in which the tongue is situated in the path of movement of the locking edge of the cover, and that the locking tongue can be swung away when it touches the locking edge of the cover, the latter being turned to its closed position and thereupon by means of a spring returned to engagement behind the locking edge in order to retain the cover in its closed position. The invention makes it possible to close the cover with only one hand. It is not necessary to move the operating arm to a certain position but only to press on the cover with one hand as the locking tongue will automatically be swung to the side and will thereupon in closed position of the cover snap in behind the locking edge. It will also be easy to open the cover. Measures could easily be taken in order to prevent an unintential opening of the cassette.

The invention will in the following be elucidated with reference had to the drawings on which some selected embodiments of the invention are shown. On the drawings:

Fig. 1 is a partly broken plane view of a cassette for X-ray photographs provided with a locking device according to the invention and with its cover in locked position, Fig. 2 shows on an enlarged scale a vertical section through the cassette on the line II—II in Fig. 1, Fig. 3 shows a vertical section on the line III—III in Fig. 1 through the very locking device in closed position, Fig. 4 is a similar section showing the locking device in open position, Figs. 5–8 show vertical sections through the locking device according to another embodiment of the invention, of which Fig. 5 shows the operating arm in its initial position, Fig. 6 shows the corresponding position of the locking tongue and the cover, Fig. 7 shows the operating arm in pressed-down position, and Fig. 8 shows a corresponding position of the locking tongue with the cover in its released position, Figs. 9–12 show a third embodiment of the locking device whereby these figures correspond with the positions of the different parts of the locking device disclosed in the Figs. 5, 6, 7, and 8 respectively.

The cassette shown in the drawings is preferably manufactured of aluminium. The main details of the cassette are composed of a bottom frame 1 of the cassette, a bottom bowl 2 surrounding the botttom frame 1, a cover 4 pivotally attached to the bottom frame 1 by means of hinges 3, and the locking device 5. A plate 6 of foam plastic or of a similar elastic material is attached to the under-side of the cover 4 which plate 6, when the cover 4 is closed, engages in the bottom frame 1 and presses the film 9 which is situated between two fluorescent screen 7, 8 against the bottom bowl 2.

At the border of bottom frame 1 situated opposite the hinges 3, a pin 11 is turnably carried with its ends situated in corner pieces 10. A sheet metal strip 12 is laid around this pin 11 and is attached to the same. It is provided with an outstanding tongue 13. The latter engages in the path of movement of a locking edge 14, directed outwards according to the Figs. 1–8 and arranged on the part of the cover 4 which is situated opposite the hinges 3.

According to the embodiment shown in Figs. 1–4, a releasing or driving arm 15 is attached to one end of the pin 11 which driving arm 15 is provided with a shoulder 16 resting against the under-side of one of the arms 17 of an operating arm 18. The arm 18 is formed as a two-armed lever and is turnably carried around a pin 19 which is parallel to the pin 11. The opposite arm 20 of the operating arm 18 is shaped as a handle and provided with a sidewards directed flange 21 serving as a finger grip and situated above a recess 22 in one of the walls of the bottom bowl 2. The arm 20 is further provided with a stop shoulder 23 directed towards the bottom frame 1. A leaf spring 24 which is attached to the bottom frame 1 presses with its free end 25 the shoulder 16 on the driving arm 15 upwards and retains it together with the pin 11, the locking tongue 13, and the opertaing arm 18 in the position shown in Fig. 3 whether the cover is open or closed.

When the film 9 and the screens 7 and 8 have been laid into the cassette, the cover 4 is closed. The locking edge or border 14 will then swing away the locking tongue 13 against the action of the spring 24 and thereupon, as soon as the locking border 14 has passed the border of the locking tongue 13, swing up above the locking edge of the cover whereby the latter is kept in closed position. When the cover is to be opened, it is sufficient to put a finger into the recess 22 and lift the operating arm 18 at the flange 21 which causes the releasing arm 15 with the shoulder 16 to be swung in clockwise direction to the position shown in Fig. 4 by means of the arm 17 in which position the locking tongue 13 releases the locking edge 14 whereupon the cover 4, owing to the elasticity of the plate 6 (not shown in Figs. 3 and 4), will be swung upwards permitting a hand to catch the locking edge 14 and thereupon to open the cover completely. As soon as the finger releases the operating arm 18, the latter, the releasing arm 15, and the pin 11 with the locking tongue 13 will return to their initial positions (Fig. 3) by means of the action of the spring 24.

In order to prevent an unintentional releasing of the locking device by a pressure from above against the pivoting joint between the shoulder 16 of the releasing arm 15 and the arm 17 which cooperates with said shoulder 16, a plate 27 is, according to the embodiment shown in the Figs. 1–4, attached by means of a screw 26 to the corner piece 10, which plate 27 prevents a touching of this joint. In the shown embodiment the plate 27 is shaped with a downwards directed lug 28 (Fig. 4) serving as an attachment for the pin 19.

The operating arm 18' is attached on the pin 11 according to the embodiment shown in the Figs. 5–8. The spring 24 presses with its free end 25 against the underside of the arm 18' and keeps the same together with the pin 11 and the locking tongue 13 in the locked position shown in Fig. 6. When a pressure is put on the upwards directed flange 21' on the operating arm 18', the locking tongue 13 is swung in clock-wise direction to the position shown in Fig. 8 in which position the tongue 13 releases the locking edge 14 of the cover 4.

The locking edge 14 of the cover 4 is directed outwards according to the two embodiments described in the foregoing. The locking edge 14" is, however, according to the embodiment shown in Figs. 9–12, directed inwards and the corresponding part of the cover 4 is catching the locking tongue 13 over the pin 11, whereas the locking tongue 13 is turned as a reflected image compared with the Figs. 2–8. Also according to the embodiment shown in Figs. 9–12, the operating arm 18" is attached to one of the ends of the pin 11. The latter passes with its ends two angle-bent brackets 29 the upwards directed branch 30 of which covers a slot 31 in the side walls 32 of the cover 4 when the latter is in closed position. The operating arm 18" is provided with an extension piece 33 passing the pin 11 against which piece 33 the free end 25 of the spring 24 presses from down in order to retain the operating arm 18" together with the pin 11 and the locking tongue 13 in the locking position shown in the Figs. 9 and 10. When the operating arm 18" is lifted with one finger under the sidewards directed flange 21", the pin 11 is turned together with the locking tongue 13 to the open position (see the Figs. 11 and 12).

The shown and described embodiments are to be regarded only as examples and the different parts of the cassette, particularly the locking device, may be changed in many ways within the scope of the invention. The expression "locking tongue" does not mean only a longitudinal sheet metal border 13 but also shoulders, plugs or similar devices extending essentially radially out from the pin 11, which are adapted to retain the correspondingly shaped free border of the cover in the locked position.

What I claim is:

1. Latch means for use in combination with a photographic cassette for containing film and through which X-ray film may be exposed, said cassette comprising a bowl having bordering edges, a cover pivotally mounted on an axis of rotation at one bordering edge of said bowl and peripherally light-sealable with said bowl to prevent exposure of film at said peripheral edge, said cover including a locking edge projection from an edge portion thereof remote from said axis of rotation and spaced from another bordering edge of said bowl opposed to said one bordering edge, said latch means including a lock tongue extending substantially parallel to said second mentioned bordering edge and locking edge portion of said cover and mounted on an axis of rotation parallel to said first mentioned axis of rotation at said second mentioned bordering edge, spring means operatively connected between said bowl and locking tongue and biasing the tongue into the path of movement of said locking portion of said cover, and an operating arm pivotally mounted on said bowl on an axis of rotation parallel to said axis of rotation of said tongue and biased by said spring means toward an inoperative position adjacent another bordering edge portion of said bowl, said locking tongue being displaceable out of the path of movement of said locking edge portion by rotation of said arm from an inoperative position or by engagement with said locking edge portion of said cover as the same is pivoted into closed relation on said bowl.

2. The structure of claim 1; said cover including a resilient pad secured to the undersurface conforming to the configuration of said cover for compressibly engaging film contained in said bowl and retaining it in an oriented position.

3. The structure of claim 1; said locking tongue including an abutment shoulder projecting radially from said second mentioned axis of rotation, said spring means comprising a leaf spring including a terminal end portion abuttingly engaged beneath said shoulder, said lever intermediately pivoted on said bowl and including an end portion engageable on said shoulder for overcoming said leaf spring and rotating said locking tongue, said lever including a lateral finger-engageable flange recessed in the edge of said bowl to facilitate rotation of said lever and release of said cover from a locked condition.

4. The structure of claim 3; said bowl including guard means thereon overlying a portion of said shoulder and lever to prevent accidental opening of said cassette.

5. The structure of claim 1; said locking edge projecting away from said first axis of rotation for engagement by said locking tongue.

6. The structure of claim 1; said locking edge projecting from said cover toward both axes of rotation for engagement by said locking tongue.

7. The structure of claim 1; said lever being integral with said locking tongue and abuttingly engaged by said spring means.

References Cited in the file of this patent

UNITED STATES PATENTS

| | | |
|---|---|---|
| 678,305 | Richards | July 9, 1901 |
| 1,512,245 | Sloan | Oct. 21, 1924 |
| 2,353,895 | Steiner | July 18, 1944 |
| 2,497,157 | De Witt | Feb. 14, 1950 |